UNITED STATES PATENT OFFICE.

KARL STEPHAN AND TADDÄUS EMILEWICZ, OF BERLIN, GERMANY, ASSIGNORS TO CHEMISCHE FABRIK AUF ACTIEN, (VORM. E. SCHERING,) OF BERLIN, GERMANY.

METHYLENGLYCERINSALICYLICACIDESTER AND PROCESS OF MAKING SAME.

No. 801,484.     Specification of Letters Patent.     Patented Oct. 10, 1905.

Application filed April 24, 1905. Serial No. 257,209.

*To all whom it may concern:*

Be it known that we, KARL STEPHAN, a citizen of the German Empire, and TADDÄUS EMILEWICZ, a citizen of the Empire of Austria-Hungary, both doctors of philosophy, chemists, residing at Berlin, Kingdom of Prussia, German Empire, have invented a new and useful Improvement in the Production of Methylenglycerinsalicylicacidester, of which the following is a specification.

If a combination of glycerin and formaldehyde corresponding to the formula of

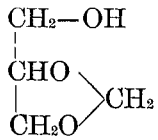

is esterified with salicylic acid, a new compound is produced which may be called methylenglycerinsalicylicacidester and which answers the formula

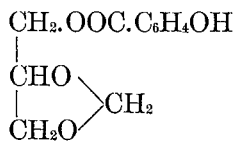

This new compound can be produced as follows: Three kilograms of salicylic acid are dissolved by the aid of heat in ten kilograms of the above-mentioned combination of glycerin and formaldehyde, which may be obtained by one of the processes of Schulz and Tollens. (See *Liebig's Annalen*, Vol. 289, page 29.) When the solution has become cool, dry hydrochloric acid is led into the same until it is nearly saturated. The product of the reaction is poured into water, the oil extracted with ether, and the ethereal solution washed with soda solution until neutral. After evaporation of the ether the product of the reaction is purified by distillation in a vacuum.

This new compound is an oily liquid having the specific gravity of 1.344 at 15° centigrade. It boils at 200° centigrade at a pressure of twelve millimeters with slight decomposition, is easily soluble in ether, alcohol, benzene, chloroform, castor-oil, more difficultly soluble in olive and sesame oils, insoluble in water, petroleum ether, glycerin, and vaseline. The compound is split up by diluted acids or alkalies into salicylic acid, glycerin, and formaldehyde.

The new compound may be used as a local remedy for rheumatism.

We claim as our invention—

1. The herein-described new compound, the constitution of which answers the formula

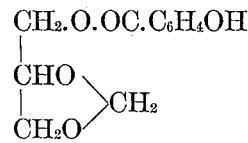

said compound being an oily liquid of the specific gravity of 1.344 at 15° centigrade, easily soluble in ether, alcohol, benzene, chloroform, castor-oil, more difficultly soluble in olive and sesame oils, insoluble in water, petroleum ether, glycerin and vaseline, and splitting up by diluted acids or alkalies into salicylic acid, glycerin and formaldehyde, substantially as set forth.

2. The process of producing the herein-described new compound, which consists in reacting upon a combination of glycerin and formaldehyde with salicylic acid, and separating the product of the reaction, substantially as set forth.

In testimony whereof we have signed our names to this specification in the presence of two subscribing witnesses.

KARL STEPHAN.
TADDÄUS EMILEWICZ.

Witnesses:
HENRY HASPER,
WOLDEMAR HAUPT.